(12) United States Patent
Kim

(10) Patent No.: US 11,035,240 B2
(45) Date of Patent: Jun. 15, 2021

(54) TURBINE VANE ASSEMBLY AND GAS TURBINE INCLUDING THE SAME

(71) Applicant: DOOSAN HEAVY INDUSTRIES & CONSTRUCTION CO., LTD., Changwon-si (KR)

(72) Inventor: Dong Hwa Kim, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 99 days.

(21) Appl. No.: 16/198,823

(22) Filed: Nov. 22, 2018

(65) Prior Publication Data

US 2019/0211698 A1 Jul. 11, 2019

(30) Foreign Application Priority Data

Jan. 8, 2018 (KR) .................. 10-2018-0002255

(51) Int. Cl.
*F01D 9/06* (2006.01)
*F02C 7/18* (2006.01)

(52) U.S. Cl.
CPC ............... *F01D 9/065* (2013.01); *F02C 7/18* (2013.01); *F05D 2240/12* (2013.01); *F05D 2260/20* (2013.01)

(58) Field of Classification Search
CPC . F01D 9/065; F01D 9/06; F01D 25/12; F02C 7/18; F02C 7/16; F02C 7/12
USPC ........................................................... 415/47
See application file for complete search history.

(56) References Cited

U.S. PATENT DOCUMENTS

| 5,996,331 A * | 12/1999 | Palmer ............... F02C 6/08 415/115 |
| 9,267,382 B2 * | 2/2016 | Szwedowicz ........... F01D 5/08 |
| 2007/0212212 A1 * | 9/2007 | Luttenberg ............ F01D 5/085 415/116 |

(Continued)

FOREIGN PATENT DOCUMENTS

| JP | 3182343 B | 7/2001 |
| JP | 2005-009410 A | 1/2005 |

(Continued)

OTHER PUBLICATIONS

Toru, JP2005009410A English Translation (Year: 2005).*

(Continued)

*Primary Examiner* — Eldon T Brockman
*Assistant Examiner* — Michael L Sehn
(74) *Attorney, Agent, or Firm* — Invenstone Patent, LLC

(57) ABSTRACT

A turbine vane assembly and a gas turbine including the turbine vane assembly are capable of adjusting a flow rate and a supply pressure of seal air by adjusting the area of a purge hole. The turbine vane assembly includes a turbine vane disposed between an outer platform and an inner platform; a U-ring unit formed of opposite sides that face each other and are each coupled to the inner platform to form a cavity; a first purge hole formed in one side of the U-ring unit to communicate with each of the cavity and a first wheel space, the first purge hole having an area that is adjustable in size; and a second purge hole formed in the other sides of the U-ring unit to communicate with each of the cavity and a second wheel space, the second purge hole having an area that is adjustable in size.

12 Claims, 7 Drawing Sheets

(56) References Cited

U.S. PATENT DOCUMENTS

2017/0234155 A1* 8/2017 Lipinski .............. F01D 25/24
                                                                    415/1

FOREIGN PATENT DOCUMENTS

| JP | 2009-047142 A | 3/2009 |
| JP | 2016-511360 A | 4/2016 |
| KR | 10-2004-0014230 A | 2/2004 |

OTHER PUBLICATIONS

Keita, JP2009047142A English Translation (Year: 2009).*
A Korean Office Action dated Mar. 19, 2019 in connection with Korean Patent Application No. 10-2018-0002255 which corresponds to the above-referenced U.S. application.

* cited by examiner

【FIG. 1】
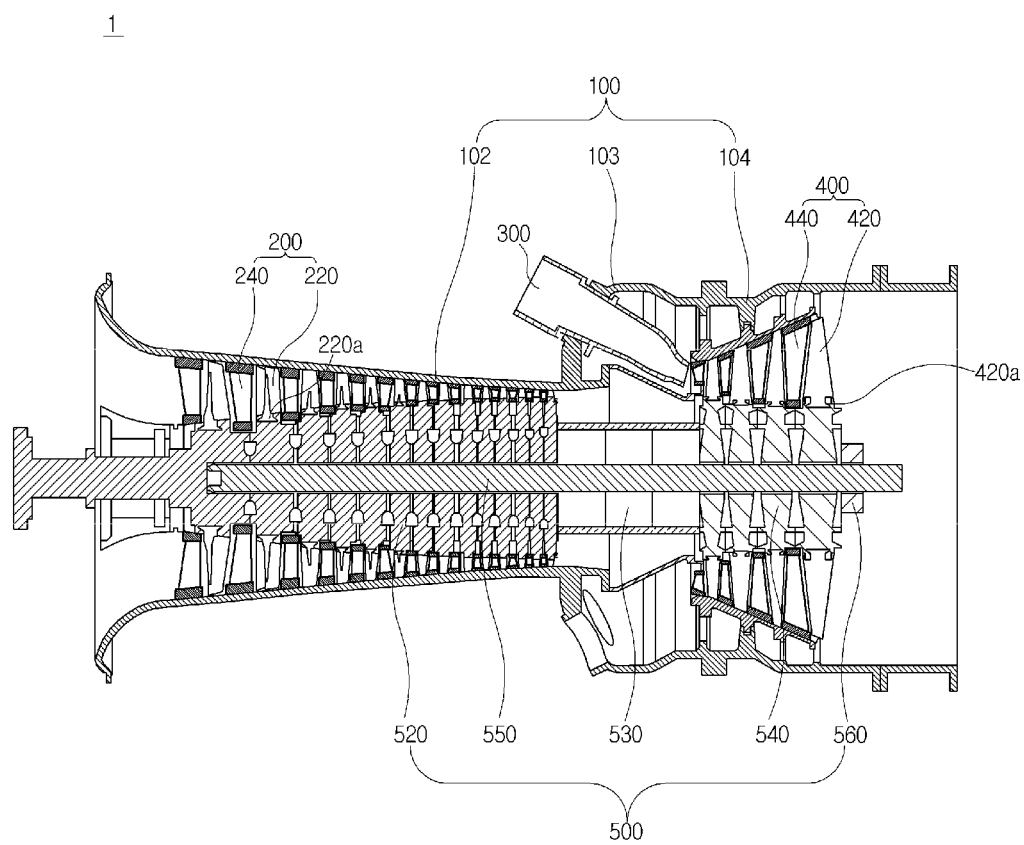

[FIG. 2]
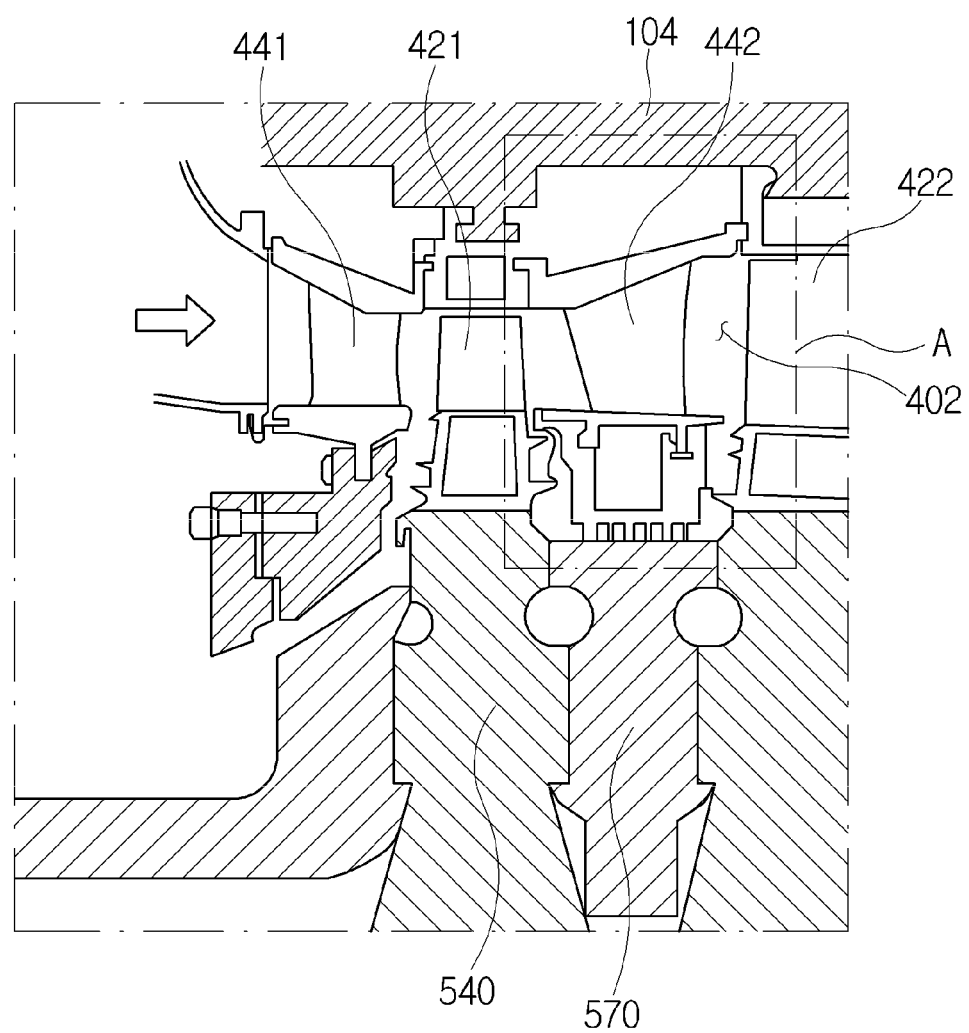

[FIG. 3]
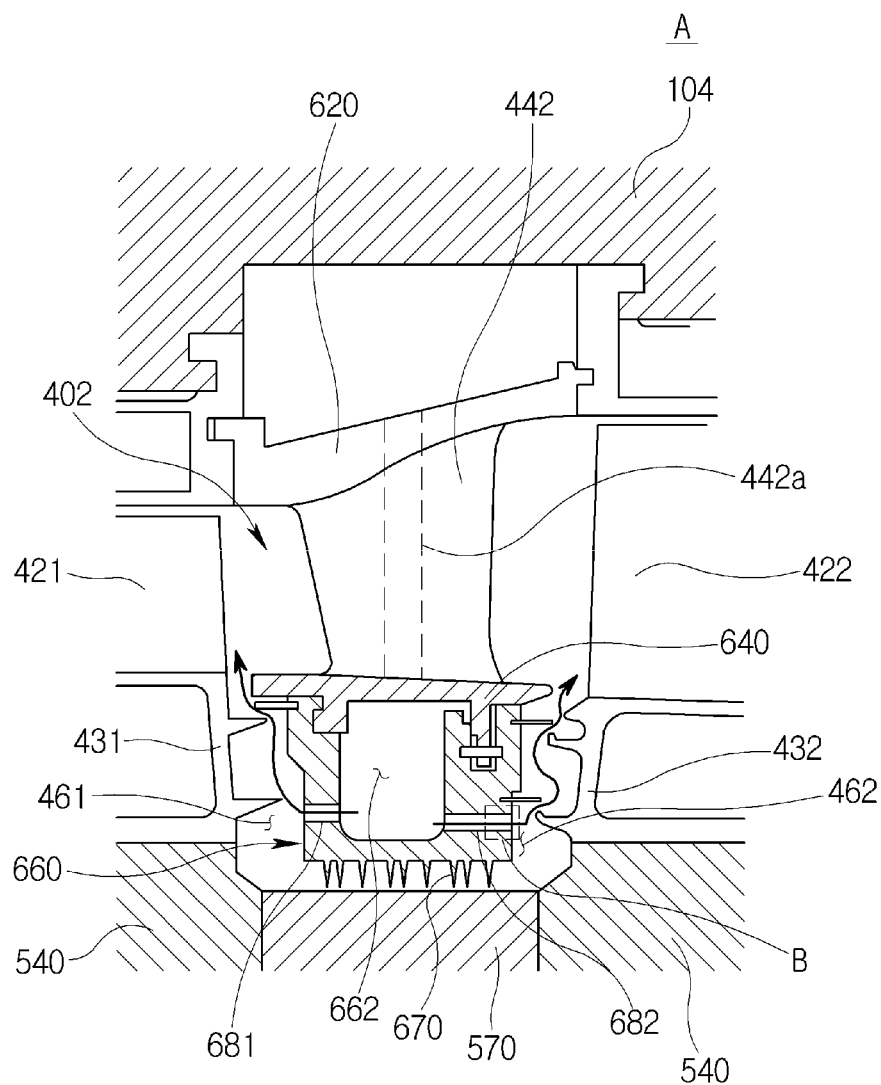

[FIG. 4]
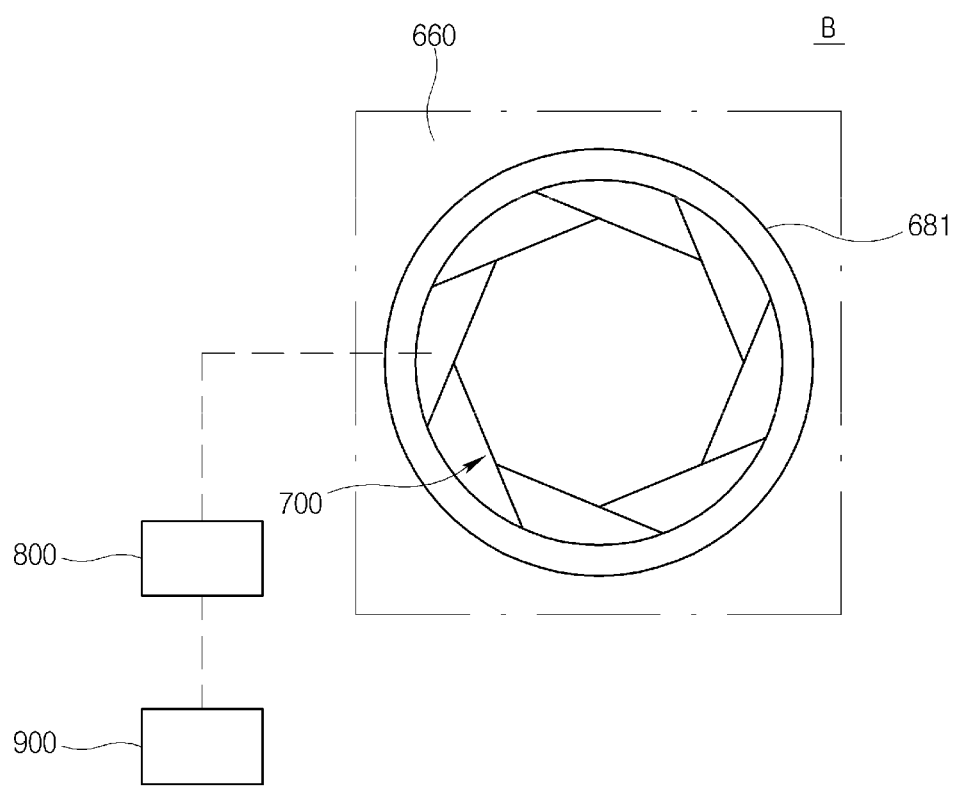

【FIG. 5】
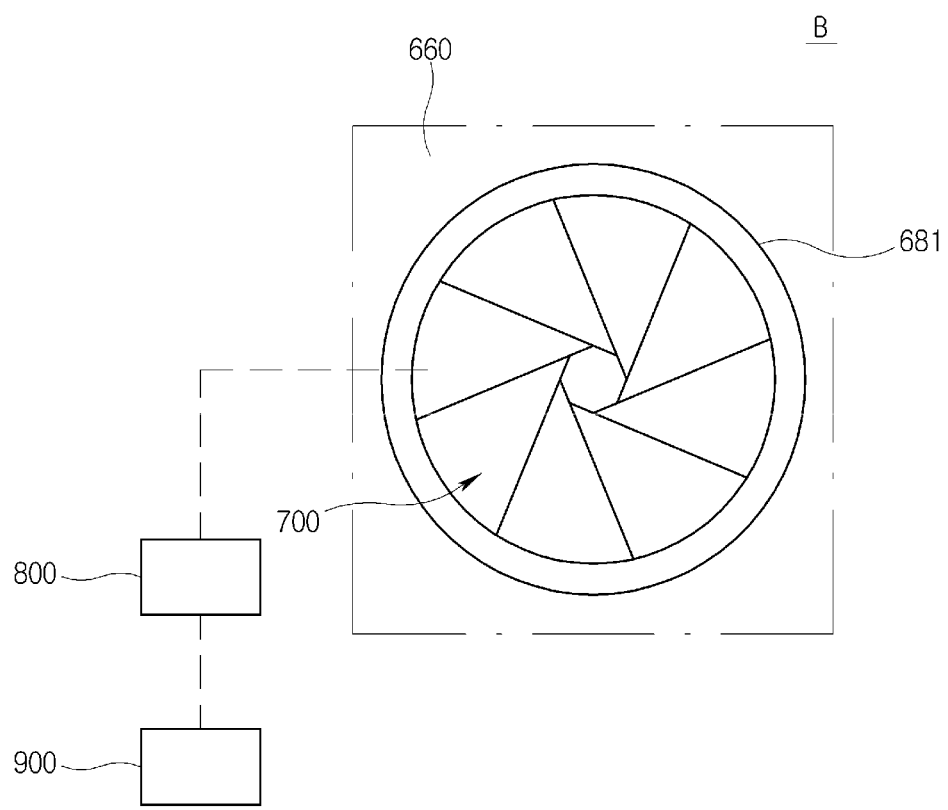

[FIG. 6]
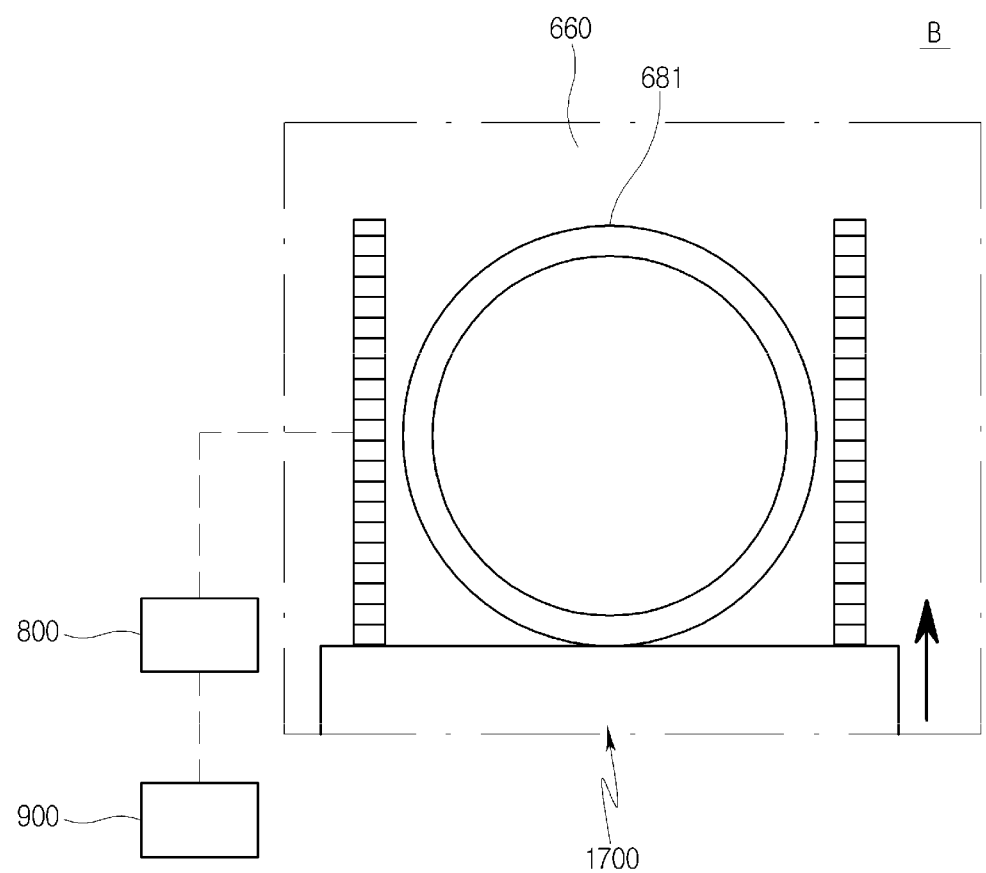

[FIG. 7]
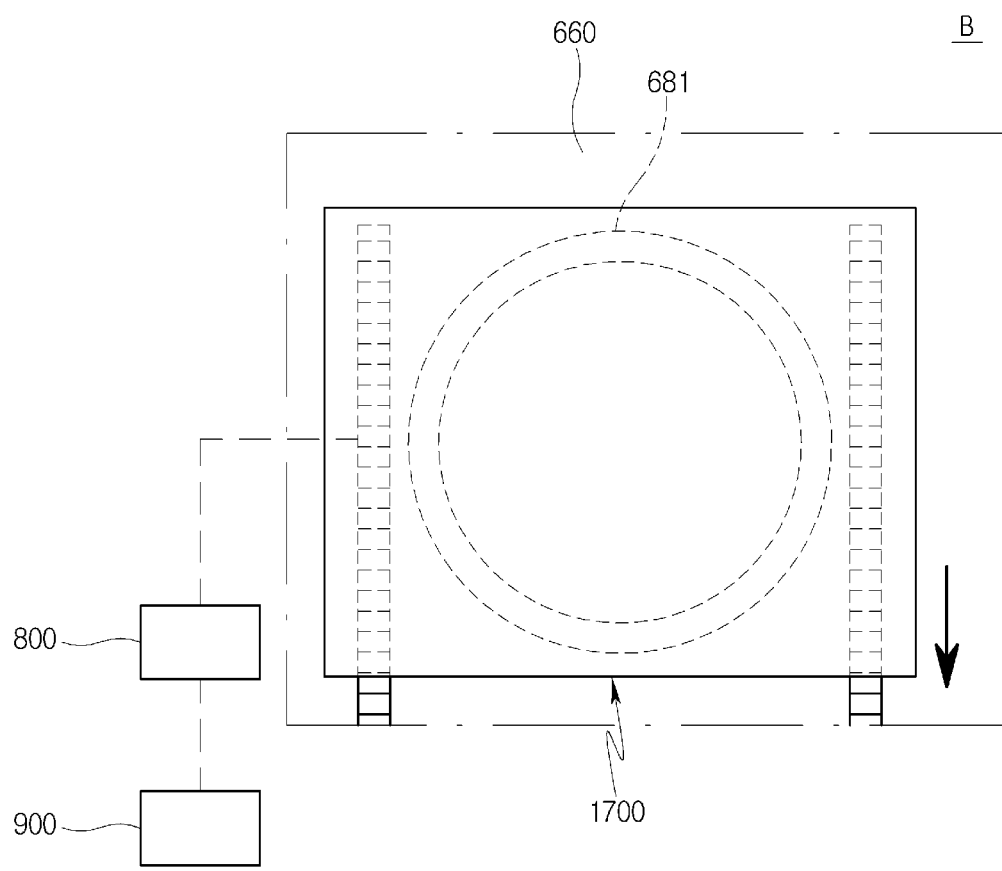

TURBINE VANE ASSEMBLY AND GAS TURBINE INCLUDING THE SAME

CROSS-REFERENCE TO RELATED APPLICATIONS

This application claims priority to Korean Patent Application No. 10-2018-0002255, filed on Jan. 8, 2018, the disclosure of which is incorporated herein by reference in its entirety.

BACKGROUND OF THE DISCLOSURE

Field of the Disclosure

Exemplary embodiments of the present disclosure relate to a turbine vane assembly and a gas turbine including the same, and more particularly, a turbine vane assembly and a gas turbine including the turbine vane assembly capable of adjusting a flow rate and a supply pressure of seal air by adjusting the area of a purge hole.

Description of the Related Art

Generally, a turbine is a machine which converts energy of a fluid such as water, gas, or steam into mechanical energy. Typically, a turbo machine, in which a plurality of blades are embedded around a circumferential portion of a rotating body so that the rotating body is rotated at a high speed by impulsive force or reactive force generated by discharging steam or gas to the blades, is referred to as a turbine.

Such turbines are classified into a water turbine using energy of elevated water, a steam turbine using energy of steam, an air turbine using energy of high-pressure compressed air, a gas turbine using energy of high-temperature/high-pressure gas, and so forth.

Generally, the gas turbine includes a compressor, a combustor, a turbine, and a rotor, and is a kind of internal combustion engine, which converts thermal energy into mechanical energy by rotating the turbine in such a way that high-temperature and high-pressure combustion gas generated by mixing fuel with air compressed to a high pressure by the compressor and combusting the mixture is discharged to the turbine.

The gas turbine does not have a reciprocating component such as a piston of a four-stroke engine. Therefore, mutual friction parts such as a piston-and-cylinder are not present, so that there are advantages in that there is little consumption of lubricant, the amplitude of vibration is markedly reduced unlike a reciprocating machine having high-amplitude characteristics, and high-speed driving is possible.

Here, the turbine includes a plurality of stages of turbine blades which rotate along with the rotor, and a plurality of stages of turbine vanes which are alternately disposed with the plurality of stages of turbine blades and are fixed to a casing.

A conventional turbine was proposed in U.S. Pat. No. 9,062,557.

In U.S. Pat. No. 9,062,557, turbine blades and turbine vanes alternate with each other. A U-ring sealing housing coupled to an inner shroud of the turbine vanes is disposed in a disk cavity formed between adjacent rotor disks.

Here, high-temperature combustion gas flowing along a main flow passage passing through the turbine blades and the turbine vanes may be drawn into the disk cavity. Due to an increase in temperature by exposure to the high-temperature combustion gas, a relatively large stress is applied to the rotor disks and the U-ring sealing housing, and thermal damage is caused, whereby the lifetime of the components may be reduced. Consequently, the efficiency of the gas turbine is reduced.

In an effort to overcome the above problems, the conventional art provides a structure for ejecting cooling air through the U-ring sealing housing to prevent high-temperature combustion gas in the main flow passage from being drawn into the disk cavity.

Here, cooling air that is bled from a compressor toward the turbine vanes may be injected into the disk cavity through an air inlet formed in an upstream-side arm of the U-ring sealing housing.

In other words, cooling air is injected to a first area of the disk cavity through the air inlet. The cooling air flows to a second area and a third area of the disk cavity.

Furthermore, the cooling air may further flow toward the rotor disk through a labyrinth seal.

Thereby, high-temperature combustion gas may be prevented from being drawn from the main flow passage into the disk cavity.

Generally, the pressure of an upstream side of the disk cavity is higher than that of a downstream side thereof.

However, the conventional art is problematic in that cooling air for both upstream and downstream sections of the disk cavity is provided from an identical pressure supply source of the U-ring sealing housing, thus leading to incorrect distribution of the cooling air.

In other words, most of the cooling air may pass through the labyrinth seal and be discharged through the downstream section of the disk cavity. Thereby, there is a problem in that high-temperature combustion gas may be drawn into the upstream section of the disk cavity.

SUMMARY OF THE DISCLOSURE

An object of the present disclosure is to provide a turbine vane assembly and a gas turbine including the turbine vane assembly capable of adjusting a flow rate and a supply pressure of seal air (cooling air) by adjusting the cross-sectional area (opening degree) of a purge hole.

Other objects and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

In various embodiments of the present disclosure, the flow rate and the supply pressure of cooling air to be supplied into spaces formed between a U-ring unit and shanks of opposite turbine blades facing the U-ring unit may be controlled by adjusting the areas of purge holes formed in the U-ring unit depending on various driving conditions.

Furthermore, the flow velocity of cooling air to be supplied to each space may be controlled.

In accordance with one aspect of the present disclosure, a turbine vane assembly may include a turbine vane disposed between an outer platform and an inner platform; a U-ring unit formed of opposite sides that face each other and are each coupled to the inner platform to form a cavity; a first purge hole formed in one side of the U-ring unit to communicate with each of the cavity and a first wheel space, the first purge hole having an area that is adjustable in size; and a second purge hole formed in the other sides of the U-ring unit to communicate with each of the cavity and a second wheel space, the second purge hole having an area that is adjustable in size.

The turbine vane assembly may further include aperture diaphragms respectively coupled to the first and second purge holes and respectively configured to increase and decrease the areas of the first and second purge holes; and a driver for driving the aperture diaphragms so that the first purge hole is opened and closed according to at least one factor of a flow rate and a supply pressure of cooling air injected into the first wheel space through the first purge hole and so that, simultaneously with or independently of the driving of the opening and closing of the first purge hole, the second purge hole is opened and closed according to at least one factor of a flow rate and a supply pressure of cooling air injected into the second wheel space through the second purge hole.

The turbine vane assembly may further include sliding covers respectively coupled to the first and second purge holes and respectively configured to increase and decrease the areas of the first and second purge holes; and a driver for driving the sliding covers so that the first purge hole is covered and uncovered according to at least one factor of a flow rate and a supply pressure of cooling air injected into the first wheel space through the first purge hole and so that, simultaneously with or independently of the driving of the covering and uncovering of the first purge hole, the second purge hole is covered and uncovered according to at least one factor of a flow rate and a supply pressure of cooling air injected into the second wheel space through the second purge hole.

In accordance with another aspect of the present disclosure, there is provided a gas turbine including a casing; a compressor configured to draw and compress air; a combustor configured to produce combustion gas by mixing fuel with the compressed air and combusting the mixture; a turbine configured to rotate a plurality of turbine blades using the combustion gas and generate power; and a rotor rotatably supported and centrally provided in the casing to pass through the compressor, the combustor, and the turbine. Here, the turbine may include a plurality of turbine blades configured to rotate integrally with the rotor; a plurality of turbine vanes alternately arranged with the plurality of turbine blades and fixed to the casing; an outer platform provided on a radial outer side of each turbine vane; an inner platform provided on a radial inner side of each turbine vane; the above U-ring unit; and the above first and second purge holes. The compressor may supply cooling air to the cavity through a turbine vane cooling passage formed in a corresponding one of the plurality of turbine vanes.

The plurality of turbine blades may include adjacent turbine blades respectively disposed on opposite sides of the U-ring unit to form the first wheel space on one side of the U-ring unit and the second wheel space on the other side of the U-ring unit, and the first and second purge holes may receive cooling air from the cavity to be injected into the first and second wheel spaces, respectively, the injected cooling air having a flow rate and a supply pressure controlled by adjusting the area of a corresponding one of the first and second purge holes. When the areas of the first and second purge holes are maximized, the flow rates and the supply pressures of the cooling air to be injected into the first and second wheel spaces through the first and second purge holes may be increased to maximum values, and when the areas of the first and second purge holes are minimized, the flow rates and the supply pressures of the cooling air to be injected into the first and second wheel spaces through the first and second purge holes may be reduced to minimum values.

The gas turbine may further include a controller configured to respectively control an area adjustment operation for the area of each of the first and second purge holes.

The controller may include a temperature sensor disposed in each of the first and second wheel spaces and may be further configured such that, when temperatures of the first and second wheel spaces are higher than a reference temperature, the areas of the first and second purge holes are increased, and when the temperatures of the first and second wheel spaces are lower than the reference temperature, the areas of the first and second purge holes are maintained or reduced, and such that, when temperatures of the first and second wheel spaces are lower than a reference temperature and a driving output is required to be increased, the areas of the first and second purge holes are maintained or reduced.

The controller may include a first pressure sensor disposed in each of the first and second wheel spaces and a second pressure sensor to measure a pressure of seal air ejected through each of the first and second purge holes and may be further configured such that, when pressures of the first and second wheel spaces are higher than the pressures of the seal air injected through the first and second purge holes, the areas of the first and second purge holes are increased, and when the pressures of the first and second wheel spaces are lower than the pressures of the seal air injected through the first and second purge holes, the areas of the first and second purge holes are maintained or reduced, and such that a pressure of the seal air injected through the first purge hole is greater than a pressure of the seal air injected through the second purge hole.

The gas turbine may further include an aperture diaphragm coupled to each of the first and second purge holes and configured to increase and decrease the areas of the first and second purge holes, or a sliding cover coupled to each of the first and second purge holes and configured to increase and decrease the areas of the first and second purge holes; and a driver for driving the aperture diaphragm or the sliding cover in order to selectively open and close the first and second purge holes. Here, the driver may be configured to simultaneously or individually adjust the size of the first purge hole and the size of the second purge hole.

The gas turbine may further include a sealing structure provided between the U-ring and the rotor facing the U-ring, and the sealing structure may separate the first wheel space from the second wheel space.

According to the present disclosure, cooling air is supplied, through purge holes formed in a U-ring unit, into respective spaces formed between the U-ring unit and shanks of opposite turbine blades facing the U-ring unit. Therefore, high-temperature combustion gas may be prevented from being drawn into the spaces. In addition, the flow rate and the supply pressure of cooling air to be supplied into the spaces may be controlled by adjusting the areas of the purge holes depending on various driving conditions.

Furthermore, the flow velocity of cooling air to be supplied to each space may be controlled by adjusting the area of the corresponding purge hole.

Consequently, an optimal amount of cooling air may be efficiently supplied. Ultimately, the efficiency of the gas turbine may be enhanced.

The effects of the present disclosure are not limited to the above, and it should be understood that the effects of the present disclosure include all effects that can be inferred from the configuration of the invention described in the detailed description of the present disclosure or the appended claims.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a sectional view of a gas turbine in which may be applied a turbine vane assembly in accordance with an embodiment of the present disclosure;

FIG. 2 is a sectional view of a portion of the first and second stages of the turbine shown in FIG. 1;

FIG. 3 is an enlarged view of a portion A of FIG. 2;

FIG. 4 is a side view of the purge hole of a portion B of FIG. 3, in which a controller and a driver are schematically shown;

FIG. 5 is a side view of the purge hole of the portion B, in which another state of the U-ring unit of FIG. 4 is shown;

FIG. 6 is a side view of the purge hole of the portion B in accordance with another embodiment of the present disclosure; and FIG. 7 is a side view of the purge hole of the portion B, in which another state of the U-ring unit of FIG. 6 is shown.

DESCRIPTION OF THE EMBODIMENTS

Hereinafter, various embodiments of a turbine vane assembly and a gas turbine including the same in accordance with the present disclosure will be described with reference to FIGS. 1 to 7.

Furthermore, the terms used in the following description are defined considering the functions of the present disclosure and may vary depending on the intention or usual practice of a user or operator. The following embodiments are only examples of the contents proposed in the claims of the present disclosure rather than limiting the bounds of the present disclosure.

In the drawings, portions which are not related to the present disclosure will be omitted to explain the present disclosure more clearly. Reference should be made to the drawings, in which similar reference numerals are used throughout the different drawings to designate similar components. In addition, when an element is referred to as "comprising" or "including" a component, it does not preclude another component but may further include the other component unless the context clearly indicates otherwise.

Hereinafter, a gas turbine 1 in accordance with an embodiment of the present disclosure will be described with reference to FIG. 1.

The gas turbine 1 may chiefly include a casing 100, a compressor 200 disposed in the casing 100 and configured to draw air and compress the air to a high pressure, a plurality of combustors 300 configured to mix fuel with air compressed by the compressor 200 and combust the mixture, and a turbine 400 configured to rotate a plurality of turbine blades using the high-temperature and high-pressure combustion gas discharged from the combustors 300 and thus generate electricity.

The casing 100 may include a compressor casing 102 which houses the compressor 200, a combustor casing 103 which houses the combustors 300, and a turbine casing 104 which houses the turbine 400. However, the present disclosure is not limited to this. For example, the compressor casing 102, the combustor casing 103, and the turbine casing 104 may be integrated with each other. The casings 102, 103, and 104 are successively arranged from an upstream side to a downstream side of the gas turbine 1.

A rotor 500, as a central shaft, may be rotatably provided in the casing 100. A generator (not shown) for generating electricity may be interlocked with the rotor 500. A diffuser may be provided at the downstream side of the casing 100 so that combustion gas that has passed through the turbine 400 is discharged to the outside through the diffuser.

The rotor 500 may include a compressor rotor disk 520, a turbine rotor disk 540, a torque tube 530, a tie rod 550, and a fastening nut 560. The compressor rotor disk 520 may be housed in the compressor casing 102. The turbine rotor disk 540 may be housed in the turbine casing 104. The torque tube 530 may be housed in the combustor casing 103 and couple the compressor rotor disk 520 with the turbine rotor disk 540. The tie rod 550 and the fastening nut 560 may couple the compressor rotor disk 520, the torque tube 530, and the turbine rotor disk 540 with each other.

In the embodiment, a plurality of (e.g., fourteen) compressor rotor disks 520 may be provided. The plurality of compressor rotor disks 520 may be arranged along an axial direction of the rotor 500. In other words, the compressor rotor disks 520 may form a multi-stage structure. Each of the compressor rotor disks 520 may have an approximately circular plate shape and may include an outer circumferential surface in which is formed a slot for coupling a compressor blade 220 (to be described later) to the compressor rotor disk 520.

The turbine rotor disk 540 may be formed in a manner similar to that of the compressor rotor disk 520. In other words, a plurality of turbine rotor disks 540 may be arranged along the axial direction of the rotor 500, such that the turbine rotor disks 540 may form a multi-stage structure. Each of the turbine rotor disks 540 may have an approximately circular plate shape and may include an outer circumferential surface in which is formed a slot for coupling a turbine blade 420 (to be described later) to the turbine rotor disk 540.

The torque tube 530 may be a torque transmission member configured to transmit the rotating force of the turbine rotor disks 540 to the compressor rotor disks 520. One end of the torque tube 530 may be coupled to the compressor rotor disk 520 that is disposed at the most downstream end. The other end of the torque tube 530 may be coupled to the turbine rotor disk 540 that is disposed at the most upstream end. Here, a protrusion may be provided on each end of the torque tube 530. A depression to engage with the corresponding protrusion may be formed in each of the associated compressor rotor disk 520 and the associated turbine rotor disk 540. Thereby, the torque tube 530 may be prevented from rotating relative to the compressor rotor disk 520 or the turbine rotor disk 540.

The torque tube 530 may have a hollow cylindrical shape to allow air supplied from the compressor 200 to flow into the turbine 400 via the torque tube 530.

Taking into account the characteristics of the gas turbine that is continuously operated for a long period of time, the torque tube 530 may be formed to resist to deformation, distortion, etc., and designed to be easily assembled and disassembled to facilitate maintenance.

The tie rod 550 may be provided to pass through the plurality of compressor rotor disks 520, the torque tube 530, and the plurality of turbine rotor disks 540. One end of the tie rod 550 may be coupled in the compressor rotor disk 520 that is disposed at the most upstream end. The other end of the tie rod 550 may protrude, in a direction opposite to the compressor 200, from the turbine rotor disk 540 that is disposed at the most downstream end, and may be coupled to the fastening nut 560.

Here, the fastening nut 560 may compress, toward the compressor 200, the turbine rotor disk 540 that is disposed at the most downstream end. Thus, as the distance between the farthest upstream compressor rotor disk 520 and the farthest downstream turbine rotor disk 540 is reduced, the plurality of compressor rotor disks 520, the torque tube 530, and the plurality of turbine rotor disks 540 may be compressed in the axial direction of the rotor 500. Consequently, the plurality of compressor rotor disks 520, the torque tube 530, and the plurality of turbine rotor disks 540 may be prevented from moving in the axial direction or rotating relative to each other.

In the present embodiment, the single tie rod is illustrated as being provided to pass through the central portions of the plurality of compressor rotor disks, the torque tube, and the plurality of turbine rotor disks. However, the present disclosure is not limited to this. For example, separate tie rods may be respectively provided in a compressor side and a turbine side, a plurality of tie rods may be arranged along a circumferential direction, or a combination thereof is also possible.

In accordance with the above-described configuration, opposite ends of the rotor 500 may be rotatably supported by bearings, and one end thereof may be coupled to a driving shaft of the generator.

The compressor 200 may include a compressor blade 220 which rotates along with the rotor 500, and a compressor vane 240 installed in the casing 100 and configured to align the flow of air drawn into the compressor blade 220.

In this embodiment, a plurality of compressor blades 220 may be provided. The plurality of compressor blades 220 may form a multi-stage structure along the axial direction of the rotor 500. A plurality of compressor blades 220 may be provided in each stage, and may be radially formed and arranged along a rotation direction of the rotor 500.

In other words, a root part 220a of each of the compressor blades 220 is coupled to a compressor blade coupling slot of the corresponding compressor rotor disk 520. The root part 220a may have a fir-tree shape to prevent the compressor blade 220 from separating from the compressor blade coupling slot in a rotational radial direction of the rotor 500.

Likewise, the compressor blade coupling slot may also have a fir-tree shape to correspond to the root part 220a of the compressor blade 220.

In the present embodiment, each of the compressor blade root part 220a and the compressor blade coupling slot is described as having a fir-tree shape, but the present disclosure is not limited thereto, and, for example, each may have a dovetail shape or the like. Alternatively, the compressor blade may be coupled to the compressor rotor disk by using a separate coupling device, e.g., a fastener such as a key or a bolt.

Here, the compressor rotor disk 520 and the compressor blade 220 are generally coupled to each other in a tangential type or an axial type scheme. The present embodiment employs a so-called axial type scheme in which the compressor blade root part 220a is inserted into the compressor blade coupling slot along the axial direction of the rotor 500, as described above. In the present embodiment, a plurality of compressor blade coupling slots may be formed. The plurality of compressor blade coupling slots may be radially formed and arranged along a circumferential direction of the compressor rotor disk 520.

In this embodiment, a plurality of compressor vanes 240 may be provided. The plurality of compressor vanes 240 may form a multi-stage structure along the axial direction of the rotor 500. Here, the compressor vanes 240 and the compressor blades 220 may be alternately arranged along the air flow direction.

Furthermore, a plurality of compressor vanes 240 may be provided in each stage, and may be radially formed and arranged along the rotation direction of the rotor 500.

Here, some of the plurality of compressor vanes 240 may correspond to variable guide vanes which are coupled to the compressor casing 102 so as to be adjustable in angle so that a flow rate of air drawn into the compressor 200 can be adjusted.

The combustor 300 functions to mix air supplied from the compressor 200 with fuel and combust the fuel mixture to generate high-temperature and high-pressure combustion gas having high energy, and may be configured to increase the temperature of the combustion gas to a heat resistance limit within which the combustor 300 and the turbine can resist heat in an isobaric combustion process.

Here, a plurality of combustors 300 may be provided. The plurality of combustors 300 may be arranged in the combustor casing along the rotation direction of the rotor 500.

Each of the combustors 300 may include a liner into which air compressed by the compressor 200 is drawn, a burner configured to inject fuel to the air drawn into the liner and combust the fuel mixture, and a transition piece configured to guide combustion gas generated by the burner to the turbine.

The liner may include a flame tube which defines a combustion chamber, and a flow sleeve which encloses the flame tube and forms an annular space.

The burner may include a fuel injection nozzle provided on a front end side of the liner to inject fuel to air drawn into the combustion chamber, and an ignition plug provided in a sidewall of the liner to ignite the fuel mixture formed by mixing the fuel with the air in the combustion chamber.

The transition piece may be configured such that an outer sidewall of the transition piece can be cooled by air supplied from the compressor so as to prevent the transition piece from being damaged by high-temperature combustion gas. Here, a cooling hole is formed in the transition piece so that air can be injected into the transition piece through the cooling hole so as to cool a main body of the transition piece. Air used to cool the transition piece may flow into the annular space of the liner and collide with cooling air provided from the outside of the flow sleeve through a cooling hole formed in the flow sleeve that forms the outer sidewall of the liner.

Although not shown, a so-called deswirler that functions as a guide vane may be provided between the compressor 200 and the combustor 300 so as to adjust a flow angle at which air is drawn into the combustor 300, to a design flow angle.

The turbine 400 may be formed in a manner similar to that of the compressor 200. Here, the turbine 400 may include the turbine blade 420 which rotates along with the rotor 500, and a turbine vane 440 which is fixed in the casing 100 and configured to align the flow of combustion gas to be drawn onto the turbine blade 420.

In this embodiment, a plurality of turbine blades 420 may be provided. The plurality of turbine blades 420 may form a multi-stage structure along the axial direction of the rotor 500. A plurality of turbine blades 420 may be provided in each stage, and may be radially formed and arranged along the rotating direction of the rotor 500.

In other words, a root part 420a of each of the turbine blades 420 is coupled to a turbine blade coupling slot of the corresponding turbine rotor disk 540. The root part 420a may have a fir-tree shape to prevent the turbine blade 420 from separating from the turbine blade coupling slot in a rotational radial direction of the rotor 500.

Likewise, the turbine blade coupling slot may also have a fir-tree shape to correspond to the root part 420a of the turbine blade 420.

In the present embodiment, the turbine blade root parts 420a and the turbine blade coupling slots are described as having a fir-tree shape, but the present disclosure is not limited thereto, and, for example, each may have a dovetail shape or the like. Alternatively, the turbine blade may be coupled to the turbine rotor disk by using a separate coupling device, e.g., a fastener such as a key or a bolt.

Here, the turbine rotor disk 540 and the turbine blade 420 are generally coupled to each other in a tangential type or an axial type scheme. The present embodiment employs a so-called axial type scheme in which the turbine blade root part 420a is inserted into the turbine blade coupling slot in the axial direction of the rotor 500, as described above. Accordingly, in the present embodiment, a plurality of turbine blade coupling slots may be formed. The plurality of turbine blade coupling slots may be arranged along a circumferential direction of the turbine rotor disk 540.

In this embodiment, a plurality of turbine vanes 440 may be provided. The plurality of turbine vanes 440 may form a multi-stage structure along the axial direction of the rotor 500. Here, the turbine vanes 440 and the turbine blades 420 may be alternately arranged along the air flow direction.

Furthermore, a plurality of turbine vanes 440 may be provided in each stage, and may be radially formed and arranged along the rotation direction of the rotor 500.

In the present embodiment, as shown in FIG. 2, a first stage turbine vane 441, a first stage turbine blade 421, a second stage turbine vane 442, and a second stage turbine blade 422 are alternately arranged. Although not shown, subsequent to the second stage turbine blade 422, third-to-nth stage turbine vanes (440) and turbine blades (420) are likewise alternately arranged.

As described above, the first stage turbine blade 421 and the second stage turbine blade 422 are coupled to the turbine rotor disk 540.

Here, a disk spacer 570 is disposed between the respective turbine rotor disks 540 to maintain a predetermined distance between adjacently coupled turbine rotor disks 540.

The turbine rotor disks 540 and the disk spacers 570 are integrally fixed by the tie rod 550 to form the rotor 500 together, and are integrally rotated.

Each of the turbine vanes 440 may be coupled to the turbine casing 104 by an outer platform and an inner platform which are respectively provided at an outer side and an inner side with respect to a radial direction of the turbine vane 440. The outer platform and the inner platform of the first stage turbine vane 441 are respectively coupled to an outer casing and an inner casing.

A structure of the turbine vane assembly for coupling the second stage turbine vane 442 to the turbine casing 104 will be described later.

The energy of high-temperature and high-pressure combustion gas discharged form the combustor 300 is converted into kinetic energy by the first stage turbine vane 441 and the second stage turbine vane 442 while the combustion gas flows along a high-temperature gas passage 402. Simultaneously, the combustion gas rotates the first stage turbine blade 421 and the second stage turbine blade 422.

Here, unlike the compressor 200, the turbine 400 makes contact with high-temperature and high-pressure combustion gas. Hence, the turbine 400 requires a cooling unit for preventing damage such as thermal deterioration.

Given this, the gas turbine in accordance with the present embodiment may further include a cooling passage through which compressed air, drawn out from portions of the compressor 200, is supplied to the turbine 400.

Depending on an embodiment, the cooling passage may extend outside the casing 100 (defined as an external passage), or extend through the interior of the rotor 500 (defined as an internal passage). Alternatively, both the external passage and the internal passage may be used.

Here, the cooling passage may communicate with a turbine blade cooling passage formed in the turbine blade 420 so that the turbine blade 420 can be cooled by cooling air.

Furthermore, the turbine blade cooling passage may communicate with a turbine blade film cooling hole formed in the surface of the turbine blade 420, so that cooling air is supplied to the surface of the turbine blade 420, whereby the turbine blade 420 may be cooled in a so-called film cooling manner by the cooling air.

In addition, the turbine vane 440 may also be formed to be cooled by cooling air supplied from the cooling passage, in a manner similar to that of the turbine blade 420.

In the gas turbine 1 having the above-described configuration, air drawn into the casing 100 is compressed by the compressor 200. The air compressed by the compressor 200 is mixed with fuel by the combustors 300, and the fuel mixture is combusted by the combustors 300, so that combustion gas is generated. The combustion gas generated by the combustors 300 is drawn into the turbine 400. The combustion gas drawn into the turbine 400 passes through the turbine blades 420 and thus rotates the rotor 500, before being discharged to the atmosphere through the diffuser. The rotor 500 that is rotated by the combustion gas may drive the compressor 200 and the generator. In other words, some of the mechanical energy obtained from the turbine 400 may be supplied as energy needed for the compressor 200 to compress air, and the remaining mechanical energy may be used to produce electricity in the generator.

Here, the gas turbine 1 is only an embodiment of the present disclosure, and a turbine vane assembly according to the present disclosure, which will be described later, may be applied to all general gas turbines.

Hereinafter, the turbine vane assembly in accordance with an embodiment of the present disclosure will be described in detail with reference to FIGS. 3 to 5.

Here, the turbine vane assembly according to the present disclosure will be described based on its application to the above-described gas turbine.

The turbine vane assembly according to the present disclosure may include a turbine vane, an outer platform provided on one side of the turbine vane, an inner platform provided on the other side of the turbine vane, and a U-ring unit coupled to the inner platform. The U-ring unit 660 is generally formed of two opposing sides that face each other and are connected by a bottom side.

Here, in the present embodiment, descriptions will be made based on the second stage turbine vane 442. The outer platform 620 may be provided at a radial outer side of the second stage turbine vane 442, and the inner platform 640 may be provided at a radial inner side of the second stage turbine vane 442.

Here, the outer platform 620 may be fixed to the turbine casing 104, and the inner platform 640 may be coupled with the U-ring unit 660.

Here, the U-ring unit 660 may be coupled to the radial inner side of the inner platform 640, for example, by a plurality of coupling units. To this end, in the present embodiment, a plurality of hook coupling parts are employed.

In this way, the outer platform 620, the second stage turbine vane 442, the inner platform 640, and the U-ring unit 660 are first coupled to each other as an assembly, which is then fixed to the turbine casing 104. The spacer 570 disposed at the radial inner side of the U-ring unit 660 may be rotated integrally with the rotor 500.

A sealing structure is provided between the U-ring unit 660 and the spacer 570. The sealing structure enables a first wheel space 461 formed between the first stage turbine blade 421 and the U-ring unit 660 and a second wheel space 462 formed between the second stage turbine blade 422 and the U-ring unit 660 to form independent spaces without communicating with each other.

The first wheel space 461 corresponds to a space formed between the U-ring unit 660 and a first stage shank 431 which couples the first stage turbine blade 421 with the turbine rotor disk 540. The second wheel space 462 corresponds to a space formed between the U-ring unit 660 and a second stage shank 432 which couples the second stage turbine blade 422 with the turbine rotor disk 540.

In other words, based on the second stage turbine vane 442, the first stage turbine blade 421 and the first wheel space 461 are formed at the vane's upstream side, and the second stage turbine blade 422 and the second wheel space 462 are formed at the vane's downstream side.

As shown in FIG. 3, the sealing structure is formed of a labyrinth seal 670 provided on the bottom side of the U-ring unit 660. However, the present disclosure is not limited to this, and various sealing structures such as a honeycomb seal and a brush seal may be employed.

A cavity 662 is formed between the inner platform 640 and the U-ring unit 660. A first purge hole 681 and a second purge hole 682 are respectively formed in the opposite sides of the U-ring unit 660. The first purge hole 681 communicates with each of the cavity 662 and the first wheel space 461, and the second purge hole 682 communicates with each of the cavity 662 and the second wheel space 462.

The first purge hole 681 is formed in an upstream side surface of the U-ring unit 660 and may consist of a plurality of first purge holes 681 formed along a circumferential direction of the U-ring unit 660. The second purge hole 682 is formed in a downstream side surface of the U-ring unit 660 and may consist of a plurality of second purge holes 682 formed along the circumferential direction of the U-ring unit 660.

Here, the number of purge holes formed along the circumferential direction of the U-ring unit 660 may correspond to the number of turbine vanes 440 that are arranged in an annular array along a circumferential direction of the rotor 500.

Therefore, cooling air drawn into the cavity 662 through a turbine vane cooling passage 442a formed in the second stage turbine vane 442 may be injected into the first and second wheel spaces 461 and 462 through the first and second purge holes 681 and 682, respectively.

Here, a control valve (not shown) for controlling cooling air to be supplied to the turbine vane cooling passage 442a may be provided on a cooling passage through which the cooling air drawn out from the compressor 200 is supplied to the turbine vane cooling passage 442a. The supply rate of cooling air to be drawn into the cavity 662 through the turbine vane cooling passage 442a may be adjusted by controlling the control valve.

Cooling air injected into the first and second wheel spaces 461 and 462 is discharged outward with respect to the radial direction of the rotor 500, in other words, into the high-temperature gas passage 402, as shown by the arrows of FIG. 3.

Hence, combustion gas in the high-temperature gas passage 402 may be prevented from being drawn into the first and second wheel spaces 461 and 462. In other words, high-temperature combustion gas may be prevented from being drawn toward the turbine rotor disk 540 and the U-ring unit 660. The discharged cooling air functions as seal air.

If high-temperature combustion gas is drawn into the first and second wheel spaces 461 and 462, to thereby increase their temperature, the combustion gas may thermally damage the turbine rotor disk 540 or the U-ring unit 660. Thereby, an increase in thermal stress due to an excessive thermal load may lead to a reduction in the lifetime of associated components. Furthermore, abnormal thermal deformation of the components may disrupt the rotation of the turbine, whereby the normal driving of the gas turbine cannot be secured. The efficiency of the gas turbine may also be reduced.

To prevent these problems, seal air is required to be reliably supplied to the first wheel space 461 and the second wheel space 462.

Here, the temperature and pressure conditions of cooling air to be drawn into the cavity 662 may vary depending on driving conditions, e.g., the driving output level or the ambient air temperature of the inlet gas turbine inlet. Temperature and pressure conditions of combustion gas in the high-temperature gas passage 402 may also be changed. Therefore, depending on the driving conditions, a required optimum supply rate or supply pressure of seal air may be changed.

Here, as the ambient temperature is reduced, the pressure in the high-temperature gas passage 402 is increased. As the output at the corresponding temperature is increased, the pressure and the flow rate on the high-temperature gas passage 402 are increased.

In contrast, as the ambient temperature is increased, the pressure in the high-temperature gas passage 402 is reduced. As the output at the corresponding temperature is reduced, the pressure and the flow rate on the high-temperature gas passage 402 are reduced.

Hence, the supply pressure and flow rate conditions of cooling air (seal air) that are required to prevent combustion gas (hot gas) in the high-temperature gas passage 402 from being drawn into the first wheel space 461 or the second wheel space 462 may be changed.

To this end, in the present disclosure, the areas of the first and second purge holes 681 and 682 may be adjusted to control the flow rate and the supply pressure of seal air to be supplied to the first and second wheel spaces 461 and 462. Throughout the present disclosure, the area of a purge hole is the area of the hole's cross-section and refers to a cross-sectional area, or size, of either of the first and second purge holes 681 and 682.

The flow velocity of seal air which is supplied into the first and second spaces 461 and 462 may be controlled by adjusting the areas of the first and second purge holes 681 and 682. However, unlike the flow rate or the supply pressure, the flow velocity of seal air does not have a great influence on a purge effect. Therefore, the following description will be made based on the case where the flow rate and the supply pressure of seal air are adjusted.

In the present embodiment, an aperture diaphragm 700 is provided on each of the first and second purge holes 681 and 682 as a structure for adjusting the area of the corresponding one of the first and second purge holes 681 and 682.

As shown in FIGS. 4 and 5, the aperture diaphragm 700 is provided in the first purge hole 681. The area of the first purge hole 681 may be adjusted by opening or closing the aperture diaphragm 700. FIG. 4 illustrates the case where the aperture diaphragm 700 is fully (or maximally) open. FIG. 5 illustrates the case where the aperture diaphragm 700 is fully (or maximally) closed.

When the aperture diaphragm 700 is fully open and the area of the first purge hole 681 is thus maximized, the flow rate and the supply pressure of cooling air to be injected into the first wheel space 461 through the first purge hole 681 are increased to the maximum values.

In contrast, when the aperture diaphragm 700 is fully closed and the area of the first purge hole 681 is thus minimized, the flow rate and the supply pressure of cooling air to be injected into the first wheel space 461 through the first purge hole 681 are reduced to the minimum values.

The turbine vane assembly may further include a driver 800 for driving the aperture diaphragm 700. The driver 800 may be formed of an actuator or similar device and is coupled to the aperture diaphragm 700 so that the area of the corresponding one of the first and second purge holes 681 and 682 can be adjusted by driving the aperture diaphragm 700.

Here, the driver 800 may be coupled to the respective aperture diaphragms of the first and second purge holes 681 and 682 and may be configured so that the areas of the first and second purge holes 681 and 682 can be either simultaneously or separately adjusted.

The turbine vane assembly may further include a controller 900 for controlling the area adjustment operation of the aperture diaphragm 700. The controller 900 may be coupled to the driver 800 to control the area adjustment operation of the aperture diaphragm 700.

Hereinbelow, the operation of the controller 900 will be described.

The controller 900 may control the first and the second purge holes 681 and 682 such that, when the temperatures of the first and second wheel spaces 461 and 462 are higher than a reference temperature, the areas of the first and second purge holes 681 and 682 are increased, and when the temperatures of the first and second wheel spaces 461 and 462 are lower than the reference temperature, the areas of the first and second purge holes 681 and 682 are maintained or reduced.

Here, the reference temperature may be set to a level lower than an allowable temperature limit at which the turbine rotor disk 540 can resist heat.

For instance, in response to the temperatures of the first and second wheel spaces 461 and 462 exceeding the reference temperature and approaching the allowable temperature limit of the turbine rotor disk 540, the areas of the first and second purge holes 681 and 682 are increased so that the flow rate and the supply pressure of cooling air to be supplied into the first and second wheel spaces 461 and 462 can be increased.

Here, to sufficiently increase the flow rate of cooling air to be supplied into the first and second wheel spaces 461 and 462 through the first and second purge holes 681 and 682 that are increased in area, the control valve on the cooling passage may be further opened so that the supply rate (flow rate) of cooling air to be drawn into the cavity 662 through the turbine vane cooling passage 442a can be increased.

In this way, since the flow rate and the supply pressure of cooling air to be supplied to the first and second wheel spaces 461 and 462 are increased, combustion gas in the high-temperature gas passage 402 may be more reliably prevented from being drawn into the wheel spaces. Hence, the temperatures of the wheel spaces may be reduced to the appropriate temperature or less, and the turbine rotor disk 540 and the U-ring unit 660 may be thermally protected.

Furthermore, if the temperatures of the first and second wheel spaces 461 and 462 are lower than the reference temperature, the areas of the first and second purge holes 681 and 682 may be maintained. In addition, if an increase in output is required, the areas of the first and second purge holes 681 and 682 may be reduced so that the flow rate and the supply pressure of cooling air to be supplied into the first and second wheel spaces 461 and 462 may be reduced.

Here, the areas of the first and second purge holes 681 and 682 may be reduced with a range in which the temperatures of the first and second wheel spaces 461 and 462 do not exceed the reference temperature.

To this end, the controller 900 may include temperature sensors (not shown) which are respectively disposed in the first and second wheel spaces 461 and 462. The areas of the first and second purge holes 681 and 682 may be adjusted depending on the temperatures of the first and second wheel spaces 461 and 462 that are measured by the temperature sensors.

In this embodiment, the descriptions have been made based on the case where, if both the temperatures of the first and second wheel spaces are higher than or lower than the reference temperature, the areas of the first and second purge holes are simultaneously adjusted. However, in the case where the temperature of only any one of the first and second wheel spaces is higher than or lower than the reference temperature, in response to this, the area of only the corresponding one of the first and second purge holes may be individually adjusted, that is, independently of the control or adjustment of the other of the first and second purge holes.

Furthermore, the controller 900 may adjust the areas of the purge holes depending on the temperatures of the first and second wheel spaces 461 and 462, as described above, and may also adjust the areas of the purge holes depending on the pressures of the first and second wheel spaces 461 and 462.

The controller 900 may control the first and second purge holes 681 and 682 such that, when the pressures of the first and second wheel spaces 461 and 462 are higher than the pressure of seal air to be ejected through the first and second purge holes 681 and 682, the areas of the first and second purge holes 681 and 682 are increased, and when the pressures of the first and second wheel spaces 461 and 462 are lower than the pressure of seal air to be ejected through the first and second purge holes 681 and 682, the areas of the first and second purge holes 681 and 682 are maintained or reduced.

Here, to sufficiently increase the supply pressure of cooling air to be supplied into the first and second wheel spaces 461 and 462 through the first and second purge holes 681 and 682 that are increased in area, the control valve on the cooling passage may be further opened so that the supply rate (flow rate) of cooling air to be drawn into the cavity 662 through the turbine vane cooling passage 442a can be increased.

To this end, the controller 900 may include first pressure sensors (not shown) respectively disposed in the first and second wheel spaces 461 and 462, and second pressure sensors (not shown) respectively provided to measure the pressures of seal air ejected through the first and second purge holes 681 and 682. The areas of the first and second purge holes 681 and 682 may be adjusted depending on a result of comparison between the pressures of the first and second wheel spaces 461 and 462 measured by the corresponding pressure sensors and the pressures of seal air ejected through the first and second purge holes 681 and 682.

Here, depending on the pressure of each of the first and second wheel spaces 461 and 462, the area of the corresponding one of the first and second purge holes 681 and 682 may also be individually and independently adjusted. That is, the detected pressures of the first and second wheel spaces 461 and 462 may result in an adjustment of the area of the corresponding one of the first and second purge holes 681 and 682, independently of the control or adjustment of the other of the first and second purge holes.

Generally, the pressure of the first wheel space 461 may be greater than the pressure of the second wheel space 462, and may be approximately double the pressure of the second wheel space 462 although the values change depending on various conditions.

To make the pressure of seal air to be supplied into the first wheel space 461 through the first purge hole 681 higher than the pressure of seal air to be supplied into the second wheel space 462 through the second purge hole 682, the areas of the first and second purge holes 681 and 682 may be controlled so that the area of the first purge hole 681 is greater than the area of the second purge hole 682.

As shown in the present embodiment, in the case where the sealing structure is formed of the labyrinth seal 670, the sealing performance is slightly reduced compared to that of a honeycomb seal or a brush seal.

Therefore, in this case, taking into account the amount of cooling air which leaks from the first wheel space 461 toward the second wheel space 462 through the labyrinth seal 670, the rate at which cooling air is supplied into the wheel space 461 may be increased. In other words, the respective areas may be controlled so that the area of the first purge hole 681 may be greater than that of the second purge hole 682.

However, the present disclosure is not limited to this, and the areas of the first and second purge holes 681 and 682 may be appropriately adjusted depending on the temperatures and pressures of the first and second wheel spaces 461 and 462, and the driving conditions, etc.

Another embodiment of the present disclosure will be described with reference to FIGS. 6 and 7. As a structure for adjusting the areas of the first and second purge holes 681 and 682, a sliding cover 1700 may be employed for each of the first and second purge holes 681 and 682.

The sliding cover 1700 is formed of a slidable plate. The slidable plate is configured to slide over the first purge hole 681 or the second purge hole 682 using a moving unit such as a rail and a conveyor for making sliding movement possible, thus adjusting the area of the first or second purge hole 681 or 682.

Here, although the sliding cover 1700 may be provided in the purge hole, it may be provided on the U-ring unit 660 to allow the sliding cover 1700 to selectively cover the purge hole, as shown in the present embodiment.

With regard to the first purge hole 681 with reference to FIG. 6, the sliding cover 1700 may be provided on the upstream side of the U-ring unit 660 to allow the sliding cover 1700 to selectively cover the first purge hole 681, to thereby open or close the corresponding purge hole to a desired degree. As the sliding cover 1700 slides, the area of the first purge hole 681 may be adjusted.

In other words, as shown in FIG. 6, if the sliding cover 1700 slides to completely uncover (maximally open) the first purge hole 681, the area of the first purge hole 681 is maximized. As shown in FIG. 7, if the sliding cover 1700 slides to completely cover (maximally close) the first purge hole 681, the area of the first purge hole 681 is minimized.

Although the present disclosure is not limited to this, in the present embodiment, the sliding cover 1700 may slide to completely cover or uncover the first purge hole 681.

The general structure of the turbine vane assembly according to the present embodiment, other than the sliding cover 1700, is the same as that of the preceding embodiment; therefore, detailed explanation will be omitted.

According to the present disclosure, since cooling air is supplied into the wheel space through the purge hole formed in the U-ring unit 660, high-temperature combustion gas in the high-temperature gas passage 402 may be prevented from being drawn into the wheel space. In addition, the flow rate and the supply pressure of cooling air to be supplied into the wheel space may be controlled by adjusting the area of the purge hole depending on various driving conditions.

Consequently, an optimal amount of cooling air may be efficiently supplied. Ultimately, the efficiency of the gas turbine may be enhanced.

While the present disclosure has been described with respect to the specific embodiments, it will be apparent to those skilled in the art that various changes and modifications may be made without departing from the scope of the disclosure as defined in the following claims.

What is claimed is:

1. A turbine vane assembly comprising:
   a turbine vane disposed between an outer platform and an inner platform;
   a U-ring unit formed of opposite sides that face each other and are each coupled to the inner platform to form a cavity;
   a first purge hole formed in one side of the U-ring unit to communicate with each of the cavity and a first wheel space, the first purge hole having an area that is adjustable in size; and
   a second purge hole formed in the other sides of the U-ring unit to communicate with each of the cavity and a second wheel space, the second purge hole having an area that is adjustable in size,
   further comprising one of:
      aperture diaphragms respectively coupled to the first and second purge holes and respectively configured to increase and decrease the areas of the first and second purge holes; and
      sliding covers respectively coupled to the first and second purge holes and respectively configured to increase and decrease the areas of the first and second purge holes,
   further comprising a driver for driving the one of the aperture diaphragms and the sliding covers in order to adjust the areas of the first and second purge holes, wherein at least one factor of a flow rate and a supply pressure of cooling air injected into the first and second wheel spaces through the first and second purge holes is adjusted by driving the driver, further comprising a controller that is coupled to the driver and comprises one of:
- temperature sensors respectively disposed in the first and second wheel spaces; and
- first pressure sensors respectively disposed in the first and second wheel spaces and second pressure sensors respectively provided to measure pressures of seal air ejected through the first and second purge holes, wherein the controller is configured to control an area adjustment operation for the area of the first purge hole and the area of the second purge hole, respectively, the area adjustment operation controlled depending on one of:
- temperatures of the first and second wheel spaces measured by the temperature sensors, and
- a result of comparison between pressures of the first and second wheel spaces measured by the first pressure sensors and the seal air pressures measured by the second pressure sensors.

2. The turbine vane assembly according to claim 1, wherein the driver is configured to simultaneously or individually adjust the area of the first purge hole and the area of the second purge hole.

3. A gas turbine comprising a casing; a compressor configured to draw and compress air; a combustor configured to produce combustion gas by mixing fuel with the compressed air and combusting the mixture; a turbine configured to rotate a plurality of turbine blades using the combustion gas and generate power; and a rotor rotatably supported and centrally provided in the casing to pass through the compressor, the combustor, and the turbine, wherein the turbine comprises:
- a plurality of turbine blades configured to rotate integrally with the rotor;
- a plurality of turbine vanes alternately arranged with the plurality of turbine blades and fixed to the casing;
- an outer platform provided on a radial outer side of each turbine vane;
- an inner platform provided on a radial inner side of each turbine vane;
- a U-ring unit formed of opposite sides that face each other and are each coupled to the inner platform to form a cavity;
- a first purge hole formed in one side of the U-ring unit to communicate with each of the cavity and a first wheel space, the first purge hole having an area that is adjustable in size; and
- a second purge hole formed in the other sides of the U-ring unit to communicate with each of the cavity and a second wheel space, the second purge hole having an area that is adjustable in size, further comprising one of:
- aperture diaphragms respectively coupled to the first and second purge holes and respectively configured to increase and decrease the areas of the first and second purge holes; and
- sliding covers respectively coupled to the first and second purge holes and respectively configured to increase and decrease the areas of the first and second purge holes, further comprising a driver for driving the one of the aperture diaphragms and the sliding covers in order to adjust the areas of the first and second purge holes, wherein at least one factor of a flow rate and a supply pressure of cooling air injected into the first and second wheel spaces through the first and second purge holes is adjusted by driving the driver, further comprising a controller that is coupled to the driver and comprises one of:
- temperature sensors respectively disposed in the first and second wheel spaces; and
- first pressure sensors respectively disposed in the first and second wheel spaces and second pressure sensors respectively provided to measure pressures of seal air ejected through the first and second purge holes, wherein the controller is configured to control an area adjustment operation for the area of the first purge hole and the area of the second purge hole, respectively, the area adjustment operation controlled depending on one of:
- temperatures of the first and second wheel spaces measured by the temperature sensors, and
- a result of comparison between pressures of the first and second wheel spaces measured by the first pressure sensors and the seal air pressures measured by the second pressure sensors.

4. The gas turbine according to claim 3, wherein the plurality of turbine blades include adjacent turbine blades respectively disposed on opposite sides of the U-ring unit to form the first wheel space on one side of the U-ring unit and the second wheel space on the other side of the U-ring unit, and wherein the first and second purge holes receive cooling air from the cavity to be injected into the first and second wheel spaces, respectively, the injected cooling air having a flow rate and a supply pressure controlled by adjusting the area of a corresponding one of the first and second purge holes.

5. The gas turbine according to claim 4, wherein, when the areas of the first and second purge holes are maximized, the flow rates and the supply pressures of the cooling air to be injected into the first and second wheel spaces through the first and second purge holes are increased to maximum values, and wherein, when the areas of the first and second purge holes are minimized, the flow rates and the supply pressures of the cooling air to be injected into the first and second wheel spaces through the first and second purge holes are reduced to minimum values.

6. The gas turbine according to claim 3, wherein the controller is further configured such that, when the temperatures of the first and second wheel spaces are higher than a reference temperature, the areas of the first and second purge holes are increased, and when the temperatures of the first and second wheel spaces are lower than the reference temperature, the areas of the first and second purge holes are maintained or reduced.

7. The gas turbine according to claim 3, wherein the controller is further configured such that, when the temperatures of the first and second wheel spaces are lower than a reference temperature and a driving output is required to be increased, the areas of the first and second purge holes are maintained or reduced.

8. The gas turbine according to claim 3, wherein the controller is further configured such that, when the pressures of the first and second wheel spaces are higher than the pressures of the seal air injected through the first and second purge holes, the areas of the first and second purge holes are increased, and when the pressures of the first and second wheel spaces are lower than the pressures of the seal air injected through the first and second purge holes, the areas of the first and second purge holes are maintained or reduced.

9. The gas turbine according to claim 3, wherein the controller is further configured such that a pressure of the seal air injected through the first purge hole is greater than a pressure of the seal air injected through the second purge hole.

10. The gas turbine according to claim 3, wherein the driver is configured to simultaneously or individually adjust the area of the first purge hole and the area of the second purge hole.

11. The gas turbine according to claim 3, further comprising a sealing structure provided between the U-ring and the rotor facing the U-ring, wherein the sealing structure separates the first wheel space from the second wheel space.

12. The gas turbine according to claim 3, wherein the compressor supplies cooling air to the cavity through a turbine vane cooling passage formed in a corresponding one of the plurality of turbine vanes.

* * * * *